United States Patent
Bector et al.

(10) Patent No.: US 7,649,844 B2
(45) Date of Patent: Jan. 19, 2010

(54) IN-ORDER FIBRE CHANNEL PACKET DELIVERY

(75) Inventors: Rajeev Bector, San Jose, CA (US); Sachin Jain, San Jose, CA (US); Ramana Mellacheruvu, San Jose, CA (US); Umesh Mahajan, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 511 days.

(21) Appl. No.: 11/027,252

(22) Filed: Dec. 29, 2004

(65) Prior Publication Data

US 2006/0153186 A1    Jul. 13, 2006

(51) Int. Cl.
*H04L 1/00* (2006.01)
(52) U.S. Cl. .................. 370/235; 370/231; 370/242; 370/248; 370/244
(58) Field of Classification Search ............ 370/431, 370/412, 389, 228, 235, 231, 244, 248; 709/232, 709/238
See application file for complete search history.

(56) References Cited

U.S. PATENT DOCUMENTS

| | | |
|---|---|---|
| 5,428,471 A | 6/1995 | McDermott |
| 5,506,838 A | 4/1996 | Flanagan |
| 5,617,421 A | 4/1997 | Chin et al. |
| 5,675,741 A | 10/1997 | Aggarwal et al. |
| 5,682,479 A | 10/1997 | Newhall et al. |
| 5,708,659 A | 1/1998 | Rostoker et al. |
| 5,740,159 A | 4/1998 | Ahmad et al. |
| 5,740,171 A | 4/1998 | Mazzola et al. |
| 5,742,604 A * | 4/1998 | Edsall et al. ........... 370/401 |
| 5,764,636 A | 6/1998 | Edsall |
| 5,809,285 A | 9/1998 | Hilland |
| 5,818,603 A | 10/1998 | Motoyama |
| 5,819,112 A | 10/1998 | Kusters |
| 5,862,125 A | 1/1999 | Russ |
| 5,959,972 A | 9/1999 | Hamami |
| 5,959,990 A | 9/1999 | Frantz et al. |
| 5,964,841 A | 10/1999 | Rekhter |
| 5,999,930 A | 12/1999 | Wolff |
| 6,035,105 A | 3/2000 | McCloghrie et al. |
| 6,046,985 A | 4/2000 | Aldred |

(Continued)

FOREIGN PATENT DOCUMENTS

EP    0772121 A    5/1997

(Continued)

OTHER PUBLICATIONS

"Link Aggregation according to IEEE 802.3ad", White Paper, SysKonnect, Oct. 10, 2002, pp. 1-22.

(Continued)

*Primary Examiner*—Ricky Ngo
*Assistant Examiner*—Dewanda Samuel
(74) *Attorney, Agent, or Firm*—Weaver Austin Villeneuve & Sampson LLP

(57) ABSTRACT

Methods and apparatus are provided for improving fiber channel packet delivery. Techniques are provided for the in-order delivery of packets by blocking incoming packets associated with a port channel change at a fiber channel switch and sending flush messages onto links associated with a port channel change. Upon receiving acknowledgments for the flush messages, incoming packets are unblocked.

25 Claims, 7 Drawing Sheets

U.S. PATENT DOCUMENTS

| | | | |
|---|---|---|---|
| 6,101,497 A | 8/2000 | Ofek | |
| 6,160,813 A | 12/2000 | Banks et al. | |
| 6,188,668 B1 | 2/2001 | Brewer et al. | |
| 6,188,694 B1 | 2/2001 | Fine et al. | |
| 6,202,135 B1 | 3/2001 | Kedem et al. | |
| 6,205,488 B1 | 3/2001 | Casey et al. | |
| 6,208,623 B1 | 3/2001 | Rochberger et al. | |
| 6,208,649 B1 | 3/2001 | Kloth | |
| 6,209,059 B1 | 3/2001 | Ofer et al. | |
| 6,219,699 B1 | 4/2001 | McCloghrie et al. | |
| 6,226,771 B1 | 5/2001 | Hilla et al. | |
| 6,243,358 B1 * | 6/2001 | Monin | 370/229 |
| 6,260,120 B1 | 7/2001 | Blumenau et al. | |
| 6,262,977 B1 | 7/2001 | Seaman et al. | |
| 6,266,705 B1 | 7/2001 | Ullum et al. | |
| 6,269,381 B1 | 7/2001 | St. Pierre et al. | |
| 6,269,431 B1 | 7/2001 | Dunham | |
| 6,295,296 B1 | 9/2001 | Tappan | |
| 6,295,575 B1 | 9/2001 | Blumenau et al. | |
| 6,330,614 B1 | 12/2001 | Aggarwal et al. | |
| 6,337,861 B1 | 1/2002 | Rosen | |
| 6,388,995 B1 | 5/2002 | Gai et al. | |
| 6,408,001 B1 | 6/2002 | Chuah et al. | |
| 6,426,952 B1 | 7/2002 | Francis et al. | |
| 6,438,612 B1 | 8/2002 | Ylonen et al. | |
| 6,473,421 B1 | 10/2002 | Tappan | |
| 6,493,349 B1 | 12/2002 | Casey | |
| 6,529,963 B1 | 3/2003 | Fredin et al. | |
| 6,532,212 B1 | 3/2003 | Soloway et al. | |
| 6,597,663 B1 | 7/2003 | Rekhter | |
| 6,604,407 B2 | 8/2003 | Kano | |
| 6,643,287 B1 | 11/2003 | Callon et al. | |
| 6,661,773 B1 | 12/2003 | Pelissier et al. | |
| 6,674,760 B1 | 1/2004 | Walrand et al. | |
| 6,728,220 B2 | 4/2004 | Behzadi | |
| 6,728,848 B2 | 4/2004 | Tamura et al. | |
| 6,766,482 B1 * | 7/2004 | Yip et al. | 714/717 |
| 6,775,230 B1 | 8/2004 | Watanabe et al. | |
| 6,804,776 B1 | 10/2004 | Lothberg et al. | |
| 6,848,007 B1 | 1/2005 | Reynolds et al. | |
| 6,859,435 B1 | 2/2005 | Lee et al. | |
| 6,879,560 B1 | 4/2005 | Cahn | |
| 6,904,053 B1 * | 6/2005 | Berman | 370/466 |
| 6,915,358 B2 | 7/2005 | Horton et al. | |
| 6,920,133 B1 | 7/2005 | Boodaghians | |
| 6,920,153 B2 | 7/2005 | Ellis et al. | |
| 6,920,154 B1 | 7/2005 | Achler | |
| 6,947,379 B1 | 9/2005 | Gleichauf et al. | |
| 6,959,151 B1 | 10/2005 | Cotter et al. | |
| 6,975,589 B2 | 12/2005 | Luft et al. | |
| 6,985,490 B2 | 1/2006 | Czeiger et al. | |
| 7,006,525 B1 | 2/2006 | Jha | |
| 7,026,288 B2 | 4/2006 | Judice et al. | |
| 7,027,406 B1 * | 4/2006 | Shabtay et al. | 370/252 |
| 7,046,679 B2 | 5/2006 | Sampath | |
| 7,050,392 B2 * | 5/2006 | Valdevit | 370/228 |
| 7,054,304 B2 | 5/2006 | Wang | |
| 7,061,858 B1 | 6/2006 | Di Benedetto et al. | |
| 7,072,298 B2 | 7/2006 | Paul et al. | |
| 7,076,594 B2 * | 7/2006 | Benedetto et al. | 710/316 |
| 7,079,544 B2 | 7/2006 | Wakayama et al. | |
| 7,082,140 B1 | 7/2006 | Hass | |
| 7,085,846 B2 * | 8/2006 | Jenne et al. | 709/232 |
| 7,155,494 B2 | 12/2006 | Czeiger et al. | |
| 7,161,935 B2 | 1/2007 | Alonso et al. | |
| 7,206,288 B2 | 4/2007 | Cometto et al. | |
| 7,216,158 B2 | 5/2007 | Revanuru et al. | |
| 7,221,652 B1 | 5/2007 | Singh et al. | |
| 7,275,103 B1 | 9/2007 | Thrasher et al. | |
| 7,301,898 B1 * | 11/2007 | Martin et al. | 370/229 |
| 7,302,494 B2 | 11/2007 | Hayashi et al. | |
| 7,319,669 B1 | 1/2008 | Kunz et al. | |
| 7,328,260 B1 | 2/2008 | Muthiyan et al. | |
| 7,330,892 B2 | 2/2008 | Ibrahim et al. | |
| 7,355,983 B2 | 4/2008 | Scudder et al. | |
| 7,376,755 B2 | 5/2008 | Pandya | |
| 7,443,799 B2 * | 10/2008 | Varanasi et al. | 370/238 |
| 7,447,224 B2 * | 11/2008 | Dropps et al. | 370/412 |
| 2001/0049739 A1 | 12/2001 | Wakayama et al. | |
| 2002/0009081 A1 | 1/2002 | Sampath et al. | |
| 2002/0075873 A1 | 6/2002 | Lindhorst-Ko et al. | |
| 2002/0085493 A1 | 7/2002 | Pekkala et al. | |
| 2002/0101868 A1 | 8/2002 | Clear et al. | |
| 2002/0110125 A1 | 8/2002 | Banks et al. | |
| 2002/0133740 A1 | 9/2002 | Oldfield et al. | |
| 2002/0150039 A1 | 10/2002 | Valdevit et al. | |
| 2002/0152338 A1 | 10/2002 | Elliott et al. | |
| 2002/0156918 A1 * | 10/2002 | Valdevit et al. | 709/238 |
| 2002/0156924 A1 | 10/2002 | Czeiger et al. | |
| 2002/0176434 A1 | 11/2002 | Yu et al. | |
| 2002/0188754 A1 | 12/2002 | Foster et al. | |
| 2003/0012204 A1 | 1/2003 | Czeiger et al. | |
| 2003/0016624 A1 | 1/2003 | Bare | |
| 2003/0067925 A1 * | 4/2003 | Choe et al. | 370/400 |
| 2003/0101239 A1 | 5/2003 | Ishizaki | |
| 2003/0118053 A1 | 6/2003 | Edsall et al. | |
| 2003/0145116 A1 | 7/2003 | Moroney et al. | |
| 2003/0149848 A1 | 8/2003 | Ibrahim et al. | |
| 2003/0163727 A1 | 8/2003 | Hammons et al. | |
| 2003/0189929 A1 | 10/2003 | Matsuzaki et al. | |
| 2003/0198247 A1 | 10/2003 | Gardner et al. | |
| 2004/0028060 A1 * | 2/2004 | Kang | 370/400 |
| 2004/0100910 A1 | 5/2004 | Desai et al. | |
| 2004/0151174 A1 | 8/2004 | Del Signore et al. | |
| 2004/0151188 A1 | 8/2004 | Maveli et al. | |
| 2004/0230787 A1 | 11/2004 | Blumenau et al. | |
| 2004/0233921 A1 | 11/2004 | Krieg et al. | |
| 2005/0018606 A1 * | 1/2005 | Dropps et al. | 370/230 |
| 2005/0018663 A1 | 1/2005 | Dropps et al. | |
| 2005/0018701 A1 * | 1/2005 | Dropps et al. | 370/412 |
| 2005/0036499 A1 | 2/2005 | Dutt et al. | |
| 2005/0080903 A1 | 4/2005 | Valenci | |
| 2005/0088969 A1 * | 4/2005 | Carlsen et al. | 370/229 |
| 2005/0108444 A1 * | 5/2005 | Flauaus et al. | 710/15 |
| 2005/0117562 A1 | 6/2005 | Wrenn | |
| 2005/0177634 A1 | 8/2005 | Scudder et al. | |
| 2005/0249123 A1 | 11/2005 | Finn | |
| 2006/0034302 A1 | 2/2006 | Peterson | |
| 2006/0038263 A1 | 2/2006 | Eigner et al. | |
| 2006/0087963 A1 | 4/2006 | Jain et al. | |
| 2006/0092932 A1 | 5/2006 | Ghosh et al. | |
| 2006/0117212 A1 | 6/2006 | Meyer et al. | |
| 2006/0159081 A1 | 7/2006 | Dropps | |
| 2007/0153816 A1 | 7/2007 | Cometto et al. | |
| 2008/0028096 A1 | 1/2008 | Henderson et al. | |
| 2008/0316942 A1 | 12/2008 | Desai et al. | |

FOREIGN PATENT DOCUMENTS

| | | |
|---|---|---|
| EP | 1134938 | 9/2001 |
| EP | 1187406 | 3/2002 |
| JP | 2-209044 | 8/1990 |
| JP | 10-293633 | 11/1998 |
| JP | 2000-22699 | 2/2000 |
| JP | 2001-154929 | 6/2001 |
| JP | 2001-320420 | 11/2001 |
| JP | 2001-345865 | 12/2001 |
| WO | WO00/31925 | 6/2000 |
| WO | WO01/19027 | 3/2001 |
| WO | WO01/95565 | 12/2001 |

WO WO02/71224 12/2002

OTHER PUBLICATIONS

Marko, Kiiskilä, "Implementation of LAN Emulation Over ATM in Linux", Tampere University of Technology, Aug. 21, 1996, 57 pages.
U.S. Office Action dated Mar. 28, 2007 from related U.S. Appl. No. 10/609,442.
U.S. Office Action dated Mar. 28, 2007 from related U.S. Appl. No. 10/791,143.
"Fibre Channel Switch Fabric-3 (FC-SW-3)", NCITS working draft, Feb. 19, 2003. XP002300830 (A,B,C).
Guan et al., Inter-fabric FC Architecture, May 30, 2003, Brocade—The Intelligent Platform for Network Storage.
"Fibre Channel Switch Fabric-2 (FC-SW-2)", NCITS working draft, Jun. 26, 2001.
Fibre Channel Generic Services-3 (FC-GS-3), NCITS working draft, Nov. 28, 2000.
Chinese Office Action, Chinese Patent Application No. 03807600.4, Issued Sep. 8, 2006.
U.S. Office Action dated May 22, 2006 from related U.S. Appl. No. 10/170,855.
K. White, IBM Corp, RFC 2925, Sep. 2000.
PCT International Search Report mailed May 23, 2003 from related PCT/US02/41072, 5 pages.
Armitage, Grenville, "MPLS: The Magic Behind the Myths," Jan. 2000, IEEE Communications Magazine, pp. 124-131. XP000908346.
Listanti et al., "Architectural and Technological Issues for Future Optical Internet Networks", Optical Solutions for Next-Generation Internet Networks, IEEE Communication Magazine, Sep. 2000.
EPO Search Report dated May 19, 2005 from related EP Application No. 03 746062.3 -1249.
U.S. Office Action dated Aug. 22, 2005 from related U.S. Appl. No. 10/034,160.
U.S. Office Action dated Dec. 13, 2005 from related U.S. Appl. No. 10/034,160.
U.S. Office Action dated May 31, 2006 from related U.S. Appl. No. 10/034,160.
U.S. Office Action dated Sep. 26, 2006 from related U.S. Appl. No. 10/034,160.
U.S. Office Action dated Feb. 5, 2007 from related U.S. Appl. No. 10/034,160.
U.S. Office Action dated Jul. 30, 2007 from related U.S. Appl. No. 10/034,160.
PCT International Search Report dated Oct. 25, 2006 from related PCT/US05/37763.
PCT Written Opinion dated Oct. 25, 2006 from related PCT/US05/37763.
PCT International Search Report dated Oct. 27, 2004 from related PCT/US2004/020518.
Ezio Valdevit, http://t11.org/index.htm, "Fabric Shortest Path First Version (FSPF) Rv. 0.2", Fabric shortest Path, May 23, 2000 XP002959525.
http://t11/org/index.htm, Fabric Shortest Path First (FSPF) Project 1508-D Switch Fabric—3 Rev. 6.5, Oct. 31, 2003, pp. 117-140.
Cisco Systems, "Cisco SAN-OS Reference Guide", 1992-2004 Cisco Systems, Inc. pp. 1-13.
Cisco Systems, "Cisco SAN-OS", 1992-2003 Cisco Systems, Inc. pp. 1-7.
Cisco Systems, "Cisco MDS 9000 Family of Multilayer Directors and Fabric Switches", 1992-2003 Cisco Systems, Inc., pp. 1-4.
DeSanti et al., "Tagged Frame Specification," Tagged Frame Spec., T11/03-353v0, May 2003, 4 pages.
Claudio DeSanti, "Virtual Fabrics", T11/03-220v0, PowerPoint presentation, Apr. 2003, 11 pages.
PCT International Search Report mailed Jul. 12, 2004 from PCT Application No. PCT/US03/36452.
Claudio DeSanti, "Virtual Fabrics N_Port Support", VF N_Support, T11/04-49v0, Jul. 2004, 13 pages.
Claudio DeSanti, "Extended_Headers", VF N_Port Model, T11/04-627v1, Oct. 2004, 1 page.
Claudio DeSanti, "Virtual Fabrics Switch Support", VF Switch Support, T11/04-395v3, Oct. 2004, 15 pages.
Claudio DeSanti, "Virtual Fabrics N_Port Support", VF N_Support, T11/04-494v2, Oct. 2004, 14 pages.
U.S. Office Action dated Apr. 4, 2007 from related U.S. Appl. No. 10/114,394.
U.S. Office Action dated May 22, 2006 from related U.S. Appl. No. 10/114,568.
U.S. Office Action dated Oct. 23, 2006 from related U.S. Appl. No. 10/114,568.
U.S. Office Action dated Apr. 6, 2007 from related U.S. Appl. No. 10/114,568.
Brocade Communication Systems, Inc. "Increasing Intelligence with the SAN Fabric", White paper, Online!, Jun. 2001 XP002251362.
Brocade Communication Systems, Inc. "Optimizing the performance and management of 2Gbit/sec SAN fabrics with ISL trunking", White paper, Online!, Mar. 2002.
Rosen et al., "Multiprotocol Label Switching Architecture", Network working group, RFC 3031, Jan. 2001 XP002251364.
Molero et al., "On the effect of link failure in fibre channel sotrage area networks", Parallel Architectures, Algorithms and Networks 2000, I-Span 2000 Proceedings, Int'l Symposium, Dec. 7-9, 2000.
VenKat Rangan: "Re: FCIP/1FCP: Gurantee In-Order delivery for FC N/NL_ports", IP Storage— Mailing List Archive, Online! http://www.pdl.cmu/edu/mailinglists/ips/mail/msg03069.html Sep. 4, 2001.
Intl. Search Report, PCT/US03/09328 mailed Oct. 17, 2003.
EPO Search Report dated Feb. 10, 2006, from related EP Application No. 03746053.2 -2416.
Cometto et al., "Methods and Apparatus for Fibre Channel Frame Delivery" U.S. Appl. No. 10/114,568 filed Apr. 1, 2002.
U.S. Office Action dated Feb. 23, 2007 from related U.S. Appl. No. 10/430,491.
D. Mills, Network Working Group Request for Comments 1059, Network Time Protocol (Version 1) Specification and Implementation, University of Delaware, Jul. 1988, pp. 1-50.
International Search Report mailed Nov. 4, 2003 from related PCT Application No. PCT/US03/18765 3 pages.
M. Rajagopal, R. et al., "IP and ARP Over Fibre Channel" Request for Comments: 2625, 'Online!, Jun. 30, 1999, XP002246207.
Charles Monia: "iFCP—A Protocol for Internet Fibre Channel Storage Networking" Nishan Systems, 'Online!, Dec. 12, 2000, XP002246205.
Mearian et al., "What's After Fibre Channel?", Computerworld, 'Online!, Oct. 15, 2001, XP002246206.
International Search Report from related PCT Application No. PCT/US03/09442, mailed Jul. 15, 2003 4 pages.
EP Office Action dated Apr. 5, 2006 from related EP Application No. 03 739 127.3-2416.
Cometto et al., Notice of Allowance for U.S. Appl. No. 10/170,855.
Cometto et al., Allowed Claims for U.S. Appl. No. 10/170,855.
U.S. Office Action dated Oct. 17, 2006 from related U.S. Appl. No. 10/114,394.
Lee et al., "Label Switching in Fibre Channel Networks" U.S. Appl. No. 10/114,394 filed Apr. 1, 2002.
Final Office Action dated Apr. 4, 2007 from related U.S. Appl. No. 10/114,394.
U.S. Office Action dated Aug. 22, 2007 from related U.S. Appl. No. 10/114,394.
EP Office Action dated Oct. 1, 2007 from related EP Application No. 03746053.2-2416.
EP Office Action dated Mar. 28, 2007 from related EP Application No. 03746053.2-2416.
Monia et al., "iFCP—A Protocol for Internet Fibre Channel Storage Networking" Feb. 2002.
Australian Office Action dated May 30, 2007 from related AU Application No. 2003226022.
U.S. Final Office Action dated Aug. 9, 2007 from related U.S. Appl. No. 10/430,491.
Final Office Action mailed Sep. 20, 2007.
Australian Office Action dated May 23, 2007 from related AU Application No. 2003226093.

Australian Office Action dated Mar. 16, 2007 from related AU Application No. 2002364204.
CN Office Action 200480010826.0, dated Oct. 19, 2007.
CA Office Action 2,487,071, dated Nov. 15, 2006.
U.S. Appl. No. 10/974,368, Office Action dated Sep. 10, 2007.
EP Office Action Application No. 03789766.7, mailed Nov. 6, 2007.
Final Office Action U.S. Appl. No. 10/609,442, mailed Sep. 5, 2007.
U.S. Final Office Action dated Feb. 5, 2007 from related U.S. Appl. No. 10/034,160.
U.S. Final Office Action dated Jan. 29, 2008 from related U.S. Appl. No. 10/034,160.
U.S. Appl. No. 10/114,394, Office Action mailed Feb. 6, 2008.
U.S. Appl. No. 10/114,568, Notice of Allowance mailed Mar. 26, 2008.
U.S. Appl. No. 10/114,568, Allowed claims.
U.S. Office Action U.S. Appl. No. 10/609,442, mailed Mar. 28, 2008.
China Office Action dated Jun. 22, 2007 from related China Application No. 03813264.8.
Australian Office Action dated Oct. 4, 2007 from related Australian Application No. 2003245492.
U.S. Appl. No. 10/430,491, Notice of Allowance mailed Nov. 23, 2007.
U.S. Appl. No. 10/170,855, Notice of Allowance mailed Mar. 6, 2007.
U.S. Appl. No. 10/114,568, Office Action mailed Sep. 20, 2007.
ATM Forum Committee, Chapter 10, "Flush Message Protocol Procedures and Frame Formats," *Lan Emulation Over ATM Version 2—LUNI Specification*, AF-Lane-0084.000, Jul. 1997, pp. 111-115.
White Paper, Link Aggregation According to IEEE Standard 802.3ad, Oct. 10, 2002, v.1.10, pp. 1-21.
Kiiskilä, Marko, "Implementation of LAN Emulation of ATM in Linux," *Tampereen Teknillinen Korkeakoulu*, Oct. 1996, 57 pages.
IEEE Std 802.3-2002, Chapter 43.5 Marker Protocol, *Part 3: Carrier Sense Multiple Access with Collision Detection (CSMA/CD) Access Method and Physical Layer Specifications*, 2002, pp. 329-345.
Notice of Allowance dated Apr. 23, 2008 for U.S. Appl. No. 10/430,491.
Office Action dated Mar. 28, 2008 U.S. Appl. No. 10/609,442.
Notice of Allowance dated May 1, 2008 for U.S. Appl. No. 10/974,368.
Office Action dated May 13, 2008 for U.S. Appl. No. 10/979,886.
International Preliminary Report on Patentability dated Dec. 29, 2004 from PCT Application No. PCT/U505/044726.
Office Action dated Jan. 18, 2005 from EP Patent Application No. 02799279.1-1525.
Office Action dated Oct. 18, 2005 from related EP Patent Application No. 02799279.1-1525.
Office Action dated Feb. 20, 2006 from EP Patent Application No. 02799279.1-1525.
EPO Search Report dated Feb. 10, 2006, from EP Patent Application No. 03746053.2-2416.
EP Office Action dated Oct. 1, 2007 from EP Patent Application No. 03746053.2-2416.
Office Action dated Mar. 28, 2007 from EP Patent Application No. 03746053.2-2416.
EPO Search Report dated May 19, 2005 from EP Patent Application No. 03 746062.3-1249.
Office Action dated Nov. 6, 2007 from EP Patent Application No. 03789766.7.
Office Action dated May 23, 2007 from AU Patent Application No. 2003226093.
Office Action dated Dec. 1, 2006 from CN Patent Application No.02828262.0.
China Office Action dated Mar. 7, 2008 from related China Application No. 03807560.1.
Office Action dated Sep. 8, 2006 from CN Patent Application No. 03807600.4.
Office Action dated May 19, 2008 from JP Patent Application No. 2003-559086.
Office Action dated Jun. 2, 2008 from JP Patent Application No. 2003-582973.

Yasumori Takizawa, "Technology Scope IP Storage Disk Divided by IP Network Wide Area Ethernet Encouraging the Same" Nikkei Communication, Mar. 4, 2000, No. 361, pp. 106-113.
Glenn Sullivan, "Building of Long Distance SAN," UNIX Magazine, Apr. 1, 2000, vol. 15, No. 4, pp. 133-137.
Fujita, et al., "SSE98-225 QoS Control Using MPLS over ATM," Technical Report of IEICE, Mar. 19, 1999, vol. 98, No. 668, pp. 81-86.
U.S. Appl. No. 11/027,252, Office Action mailed Dec. 12, 2008.
Canadian Office Action dated Aug. 13, 2008 from related CA Application No. 2,472,056.
Chinese Office Action dated Sep. 5, 2008 from related CN Application No. 200380104466.6.
U.S. Appl. No. 10/034,160 dated Nov. 19, 2008.
U.S. Appl. No. 10/979,886 dated Nov. 25, 2008.
Canadian Office Action dated Aug. 13, 2008 from related CA Application No. 2,480,462.
Chinese Office Action dated Dec. 26, 2008 from related CN Application No. 03807560.1.
Final Office Action mailed Aug. 21, 2008 from U.S. Appl. No. 10/114,394.
Notice of Allowance for U.S. Appl. No. 10/430,491 dated Aug. 8, 2008.
Supplemental Notice of Allowance for U.S. Appl. No. 10/430,491 dated Aug. 26, 2008.
Allowed Claims for U.S. Appl. No. 10/430,491.
Notice of Allowance for U.S. Appl. No. 10/609,442, mailed Sep. 26, 2008.
Office Action mailed Sep. 12, 2008 for U.S. Appl. No. 10/974,368.
Examination Report dated Jul. 14, 2008 from Australian Patent Application No. 20032966301.
CN Office Action 200580034140.X, dated Jun. 6, 2008.
Japanese Application No. 2003-582964, Office Action dated May 12, 2008.
Japanese Office Action dated Dec. 22, 2008 from related JP Application No. 2003-582973.
Chinese Office Action issued on Jun. 22, 2007 for Patent Application No. 03813264.8.
Dutt, Dinesh G., et al. "Fibre Channel Switch that Enables End Devices in Different Fabrics to Communicate With One Another While Retaining Their Unique Fibre Channel Domain_IDS," U.S. Appl. No. 12/343,843, dated Dec. 24, 2008.
Canadian Office Action issued on Jan. 30, 2008 for Patent Application No. 2,480,461.
Chinese Office Action for Patent Application No. 200480010826.0, dated Nov. 7, 2008.
Office Action issued on Nov. 19, 2008 for U.S. Appl. No. 10/034,160.
Office Action for CA Patent Application No. 2,521,463 dated Sep. 24, 2008.
U.S. Appl. No. 10/974,368, Notice of Allowance dated Feb. 13, 2009.
Office Action dated Nov. 19, 2008 for U.S. Appl. No. 10/034,160.
Office Action dated Nov. 25, 2008 for U.S. Appl. No. 10/979,886.
Office Action mailed for U.S. Appl. No. 10/114,394, Mar. 23, 2009.
Office Action for AU Patent Application No. 20043000650, dated Sep. 26, 2008.
Notification of Provisional Rejection for KR Patent Application No. 2004-7010143 dated Apr. 15, 2009.
Second Office Action issued on Apr. 28, 2009 for Canadian Patent Application No. 2,472,056.
Second Office Action issued on Apr. 24, 2009 for Chinese Patent Application No. 200380104466.6.
Chinese Office Action, Chinese Patent Application No. 03807600.4, Issued May 8, 2009.
Notice of Allowance dated Apr. 21, 2009 from U.S. Appl. No. 10/974,368.
Allowed Claims for U.S. Appl. No. 10/974,368.
Notice of Allowance dated May 29, 2009 from U.S. Appl. No. 10/034,160.
Allowed Claims for U.S. Appl. No. 10/034,160.

* cited by examiner

IN-ORDER FIBRE CHANNEL PACKET DELIVERY

CROSS-REFERENCE TO RELATED APPLICATIONS

The present application is related to U.S. patent application Ser. No. 10/114,568 by Maurilio Cometto and Scott S. Lee, filed on Apr. 1, 2002 and titled Methods And Apparatus For Fibre Channel Packet Delivery, the entirety of which is incorporated by reference for all purposes.

BACKGROUND OF THE INVENTION

1. Field of the Invention

The present invention relates to fibre channel networks. More specifically, the present invention relates to methods and apparatus for providing in order delivery of fibre channel packets in a fibre channel network upon detecting a change in a port channel.

2. Description of Related Art

Many conventional network protocols allow the out of order delivery of a packet sequence. A network node in a TCP/IP based network can receive an out of order set of packets and reorder the packets upon receipt. Packets often arrive out of order if they travel along different paths or along different links within a path to reach a destination.

However, some fibre channel applications and devices can not handle out of order packets. A port channel typically includes multiple links connecting two fibre channel entities. Multiple links seen as a single link between two fibre channel entities is referred to herein as a port channel. A change in port channel membership, also referred to herein as a port channel change, can lead to out of order delivery of packets in a fibre channel fabric. In some examples, a port channel change can result from the addition or removal of a link. Some mechanisms in existing networks call for the flushing of all packets in the network upon detecting a port channel change by waiting a certain worst-case period of time. In some examples, a 500 ms wait period is enforced.

Waiting for all of the packets to be flushed can prevent out of order delivery when a port channel change is detected. However, waiting for all of the packets to be flushed can be very disruptive to network operation, as more packets are dropped than is necessary and network operation is at least temporarily halted. In many instances, applications in the storage area network do not efficiently handle 500 ms halts in network operation.

It is therefore desirable to provide methods and apparatus for improving fibre channel packet delivery and providing in order delivery particularly during port channel changes.

SUMMARY OF THE INVENTION

Methods and apparatus are provided for improving fibre channel packet delivery. Techniques are provided for the in-order delivery of packets by blocking incoming packets associated with a port channel change at a fibre channel switch and sending flush messages onto links associated with a port channel change. Upon receiving acknowledgments for the flush messages, incoming packets are unblocked.

In one embodiment, a method for providing in order delivery of fibre channel packets upon detecting a membership change at a port channel is provided. Fibre channel packets associated with the port channel at a first fibre channel switch are blocked. The port channel includes multiple links connecting the first fibre channel switch to a second fibre channel switch. Multiple flush packets are transmitted on the multiple links. Fibre channel packets associated with the port channel are unblocked upon receiving acknowledgments for the multiple flush packets from the second fibre channel switch.

In another embodiment, a fibre channel switch for providing in order delivery of fibre channel packets upon detecting a membership change at a port channel is provided. The fibre channel switch includes a processor and an interface. The processor is configured to block fibre channel packets associated with the port channel. The port channel includes multiple links connected to a neighboring fibre channel switch. The output interface is configured to transmit multiple flush packets on the multiple links. The processor is further configured to unblock fibre channel packets associated with the port channel upon receiving acknowledgments for the multiple flush packets from the neighboring fibre channel switch.

A further understanding of the nature and advantages of the present invention may be realized by reference to the remaining portions of the specification and the drawings.

BRIEF DESCRIPTION OF THE DRAWINGS

The invention may best be understood by reference to the following description taken in conjunction with the accompanying drawings, which are illustrative of specific embodiments of the present invention.

DETAILED DESCRIPTION OF SPECIFIC EMBODIMENTS

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of fibre channel networks. However, it should be noted that the techniques of the present invention can be applied to different variations and flavors of fibre channel. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Furthermore, techniques and mechanisms of the present invention will sometimes be described in singular form for clarity. However, it should be noted that some embodiments can include multiple iterations of a technique or multiple instantiations of a mechanism unless noted otherwise. For example, a processor is used in a variety of contexts. However, it will be appreciated that multiple processors can also be used while remaining within the scope of the present invention.

Figure 1:
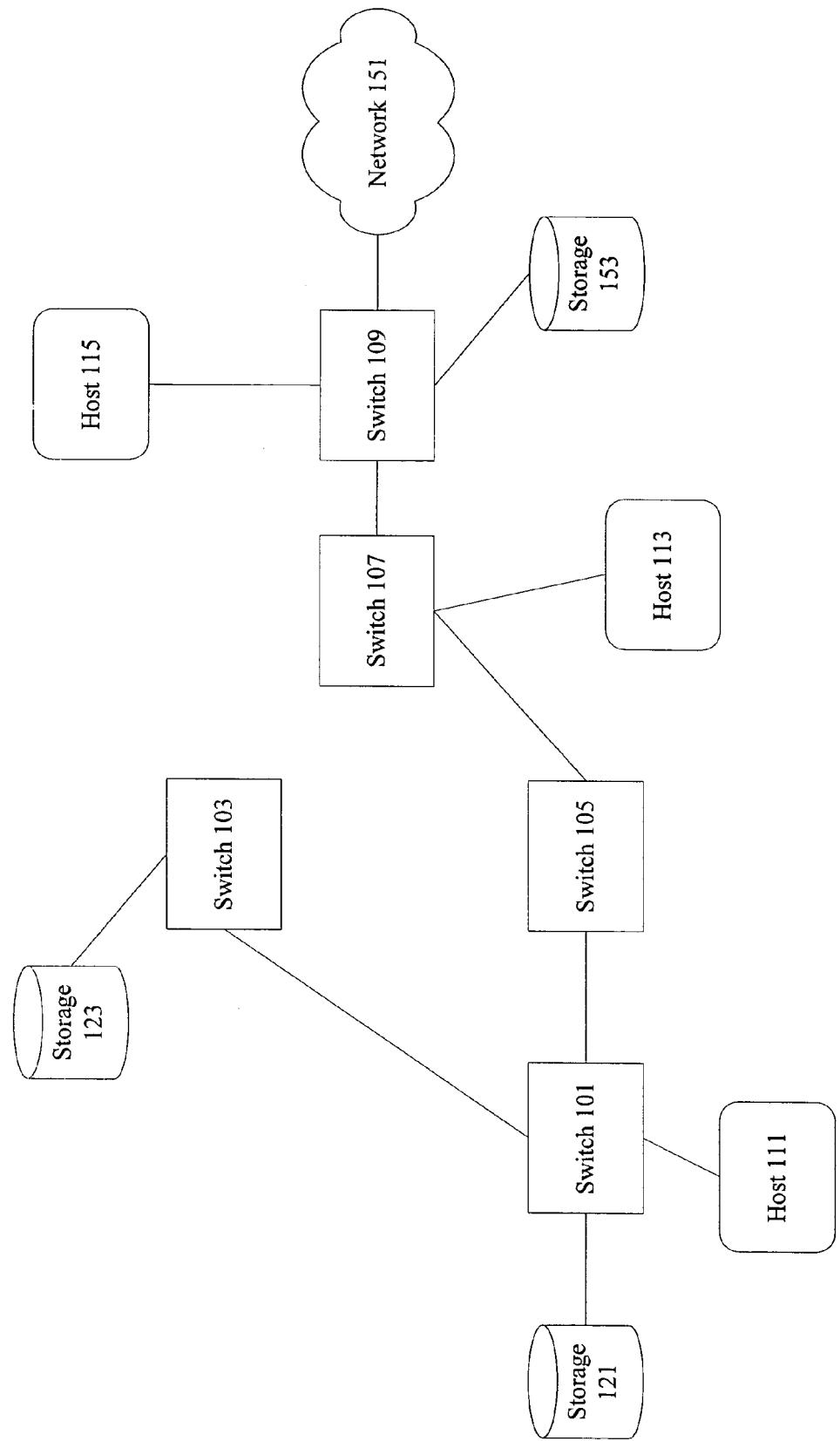
FIG. 1 is a diagrammatic representation showing a fibre channel network that can use the techniques of the present invention.

FIG. 1 is a diagrammatic representation of one example of a network that can use the techniques of the present invention. FIG. 1 shows a storage area network implemented using fibre channel. A switch 101 is coupled to switches 103 and 105 as well as to a host 111 and storage 121. In one embodiment, host 111 is a server or client system while storage 121 is any storage subsystem such as a single disk or a redundant array of independent disks (RAID). Switch 105 is coupled to switch 107. Switch 107 is connected to host 113 and switch 103 is connected to storage 123. Switch 109 is connected to host 115, switch 107, host 153, and an external network 151 that may or may not use fibre channel. In order for a host 111 to access network 151, a path going through switch 105 can be used. It should be noted that any apparatus including a processor, memory, and a connection to a fibre channel fabric can be referred to as a fibre channel switch.

Ports used to connect switches to each other in a fibre channel network are referred to herein as non fabric-port (non F-ports). Non fabric-ports include interswitch ports (E-ports). Ports used to connect a switch to a host a referred to herein as fabric-ports (F-ports). In one example, non F-ports are used to connect switch 105 to switch 107 while F-ports are used to connect switch 107 to host 113. Similarly, fabric loop-ports (FL-ports) are used to connect switch 103 to storage 123. Ports such as F-ports and FL-ports are herein referred to as edge ports. Other ports such as E-ports are referred to as non-edge ports.

According to various embodiments, a packet transmitted from host 111 to a network 151 or to a storage device 153 includes parameters such as the exchange identifier, a sequence, and a sequence number. The exchange identifier can provide information on what exchange the packet belongs to. The sequence can provide information on what portion of the exchange the packet belongs to while the sequence number can provide information on how the packets should be ordered. Sequence numbers can be used to allow for in order delivery of fibre channel packets.

Some fibre channel devices such as certain storage disks and disk arrays require that packets be received in the order in which they were transmitted. Conventional networks such as TCP/IP networks do not have such a requirement, as TCP/IP networks generally have mechanisms for reordering packets upon receipt. If packets with sequence numbers of 191, 192, and 193 are transmitted in order in a fibre channel network, a fibre channel device receiving the packets may expect that the packets are in the same order in which they were transmitted. A fibre channel device or associated applications may not be able to handle receiving the packets out of order.

In a static fibre channel network, packets will typically be received in the order in which they were transmitted. However, several occurrences can lead to the out of order delivery of fibre channel packets. Port channel changes in particular can lead to out of order delivery.

Figure 2:
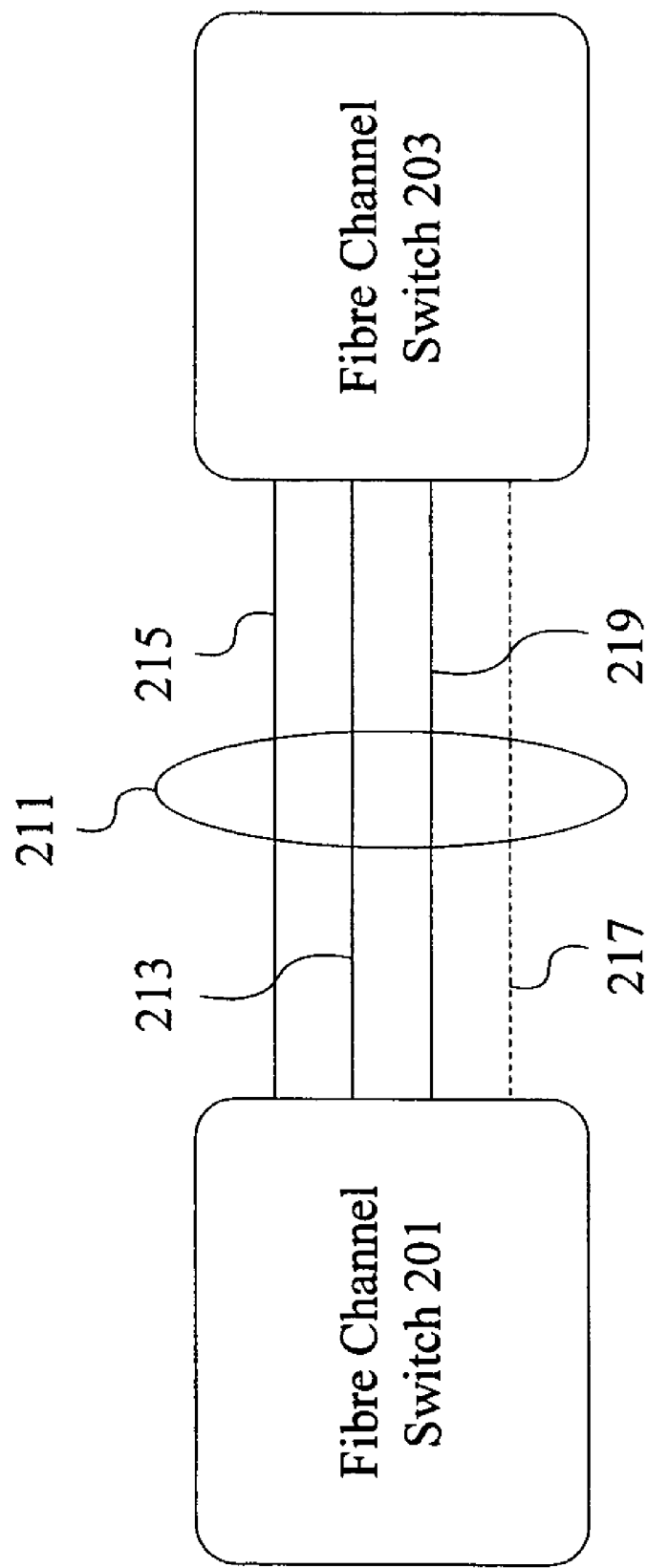
FIG. 2 is a diagrammatic representation showing two interconnected fibre channel switches.

FIG. 2 is a diagrammatic representation showing a port channel between two fibre channel switches. Fibre channel switch 201 is coupled to fibre channel switch 203 through port channel 211. The port channel 211 includes multiple links that are provided for features such as load balancing and redundancy. The port channel 211 includes links 213, 215, 217, and 219. According to various embodiments, link 219 is a link being added to port channel 211. In typical implementations, packets associated with a particular flow are transmitted in order on a particular link, such as link 213.

An abstraction identifying traffic with particular characteristics between two nodes is herein referred to as a flow. In one example, a flow is referenced by a source identifier, a destination identifier, a priority, a class, and an exchange identifier. Other characteristics are also possible. It should be noted, however, that a flow may also be referenced merely by a source and destination identifier.

By transmitting all packets associated with a flow on a selected link, in order delivery from a fibre channel switch 201 to fibre channel switch 203 is assured. However, during port channel changes, such as the addition or removal of a link, packets associated with a flow may no longer be transmitted on the same link. For example, when a link 219 is added to a port channel 211, the traffic previously allocated to links 213, 215, and 217 may be reallocated amongst links 213, 215, 217, and 219.

Consequently, packets in a flow previously transmitted on link 213 may now be transmitted on link 219. The first, second, and third packets may be transmitted on link 213 while the fourth, fifth, and sixth packets may be transmitted on link 219. However, for various reasons such as differences in link latency and buffer characteristics, the fourth packet may be received/transmitted at fibre channel switch 203 before the third packet is received/transmitted.

Out of order packet delivery can not be handled by many fibre channel applications and devices. By contrast, many Telnet Control Protocol/Internet Protocol (TCP/IP) applications have mechanisms for reordering packets. Consequently, some mechanisms have been implemented in conventional systems to prevent out of order delivery in fibre channel networks. In one example, a fibre channel switch 201 detects a port channel change and immediately stops transmitting fibre channel packets. In this example, the fourth, fifth, and sixth packets in a sequence would not be transmitted and would remain in a buffer at switch 201. Fibre channel switch 201 would wait a period of time for the first, second, and third packets to be successfully forwarded from fibre channel switch 203.

However, fibre channel switch 201 does not know exactly when the first, second, and third packets have been forwarded by fibre channel switch 203. Consequently, fibre channel switch 201 waits a worst case period of time, such as 500 ms before resuming transmissions. The worst case period of time may be ascertained by determining the length of time packets remain on the links and in the buffers of fibre channel switch 203. Any worst case period of time taken for the links and buffers to clear at an fibre channel switch at the receiving end of a port channel change is referred to herein as a link drain period.

During the link drain period, additional packets such as the seventh and eighth packets associated with the flow may be received at fibre channel switch 201. At some point, buffers fill and packets are dropped. Dropping packets is also undesirable in fibre channel networks. Furthermore, the link drain period may cause a fibre channel application to stop receiving packets for a relatively long period of time. The fibre channel application may initiate some error recovery mechanism at a higher level which is also highly undesirable. According to various embodiments, the techniques of the present invention provide a mechanism for forwarding packets during port channel change that remains transparent to higher level applications. Packets are delivered in order while minimizing packet drops.

According to various embodiments, a switch 201 blocks all incoming traffic associated with a port channel 211 when a port channel change is detected. In one example, a switch 201 blocks incoming traffic by withholding credits on input ports. As will be appreciated, packets are only transmitted across a link when a credit is provided by a receiver. If the receiver withholds credits, no additional packets are transmitted. Fibre channel provides an effective mechanism for blocking incoming traffic associated with a port channel change. This mechanism is not available in conventional IP networks. According to various embodiments, a fibre channel switch 201 proceeds to explicitly send flush messages to fibre channel switch 203 on the links associated with the port channel change. When the traffic on the links associated with the port channel change have either been forwarded or dropped at a fibre channel switch 203, the fibre channel switch 203 sends acknowledgments for each flush message back to fibre channel switch 201.

After all of the acknowledgments associated with the flush messages are received at fibre channel switch 201, the input ports are unblocked and traffic can continue flowing without risk of out of order delivery. In typical instances, flush messages are received in a much shorter time period than a worst case link drain latency. Consequently, traffic is not stalled for as long at an fibre channel switch 201 and there is less risk of packet drops.

One of the mechanisms that can impact the order in which fibre channel packets are delivered are the buffers within a fibre channel switch. A packet transmitted first from a switch 201 can remain in a buffer associated at a switch 203 while a packet transmitted later on a different link from a switch 201 can be delivered quickly through a switch 203 if flushing mechanisms are not used.

Figure 3:
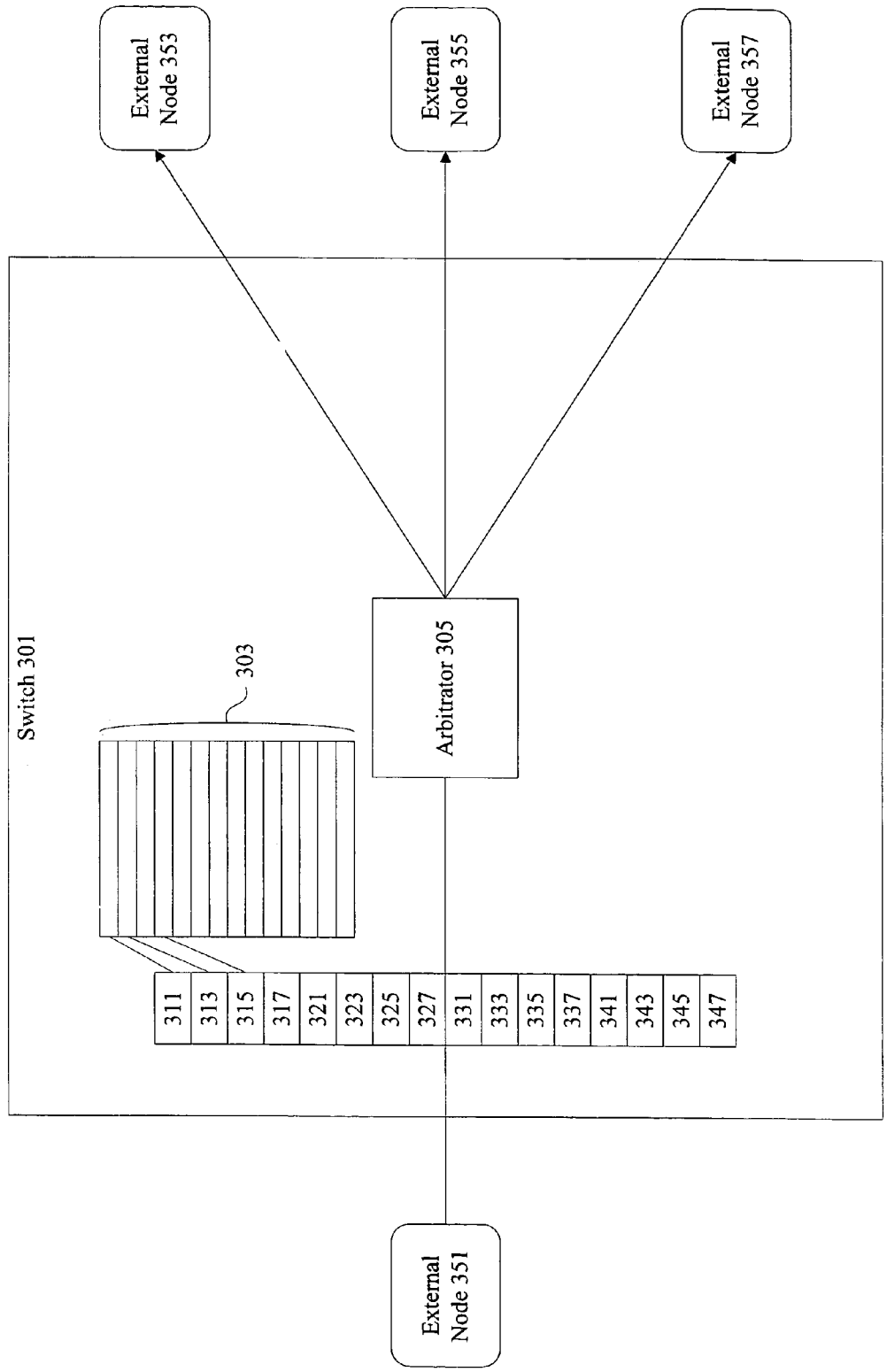
FIG. 3 is a diagrammatic representation showing two interconnected fibre channel switches with virtual output queues.

FIG. 3 is a diagrammatic representation of buffers and/or queues that can be associated with a fibre channel switch, according to various embodiments. Although one particular type of queue will be described, it should be noted that a variety of different input and output queues associated with various input and output ports can be used to implement the techniques of the present invention.

A switch 301 is connected to external nodes 351, 353, 355, and 357. The switch 301 includes a buffer 303 of shared memory associated with each switch port. A buffer 303 is associated with external node 351. Buffers associated with external nodes 353, 355, and 357 are not shown for purposes of clarity. The buffer 303 can hold traffic destined for external nodes 353, 355, 357, and loop back traffic to external node 351.

In typical implementations, packets destined for the various external nodes are all placed in the same buffer 303. In one example, a port channel change occurs on the link to external node 353. If the switch 301 has to wait a long period of time for the packets associated with the port channel to flush out of external node 353, all ports may end up congested. For example, when a switch 301 receives a large volume of packets destined for external node 353, packets associated with external node 353 can use the entire buffer 303.

According to various embodiments, the packets stored in buffer 303 are referenced by pointers in packet descriptor queues 311-447. Each packet descriptor can contain a pointer or reference identifying where the packet is stored in the buffer 303. Pointers or references to a shared buffer are herein referred to as descriptors. Descriptors can also identify other information such as packet priority.

In one example, an arbitrator 305 selects packets using a round-robin methodology. In a first round, a packet destined for external node 353 is selected. In a second round, a packet destined for external node 355 is selected, etc. More particularly, the arbitrator 305 may first select a high priority packet associated with descriptor 311 destined for external node 353, then select a high priority packet associated with descriptor 321 destined for external node 355, then select a high priority packet associated with descriptor 331 destined for external node 357, etc. It should be noted that a variety of techniques for selecting a packet can be used, as will be appreciated by one of skill in the art.

A queuing system having buffers apportioned based on destination is referred to herein as virtual output queuing (VOQ). VOQ is described further in Tamir Y., Frazier G.: "High Performance multi-queue buffers for VLSI communications switches", Proc. Of 15th Ann. Symp. On Comp. Arch., pp. 343-354, June 1988, the entirety of which is incorporated by reference for all purposes.

According to various embodiments, packets in a particular flow may be blocked because a buffer 303 is full. Consequently, it is desirable to stop transmission over a port channel after a port channel change is detected for as short a period of time as possible. Long delays can also adversely impact storage area network applications.

The techniques of present invention provide various mechanisms for blocking traffic associated with a port channel change. In one example, only incoming traffic configured for output on the port channel being changed is blocked. In another example, all incoming traffic onto a fibre channel switch 301 is blocked. In another example, incoming traffic associated with affected flows are blocked by withholding credits on links associated with the affected flows. Data associated with nonaffected flows is left unblocked. For example, traffic destined for external nodes 355 and 357 can be allowed to continue flowing.

Figure 4:
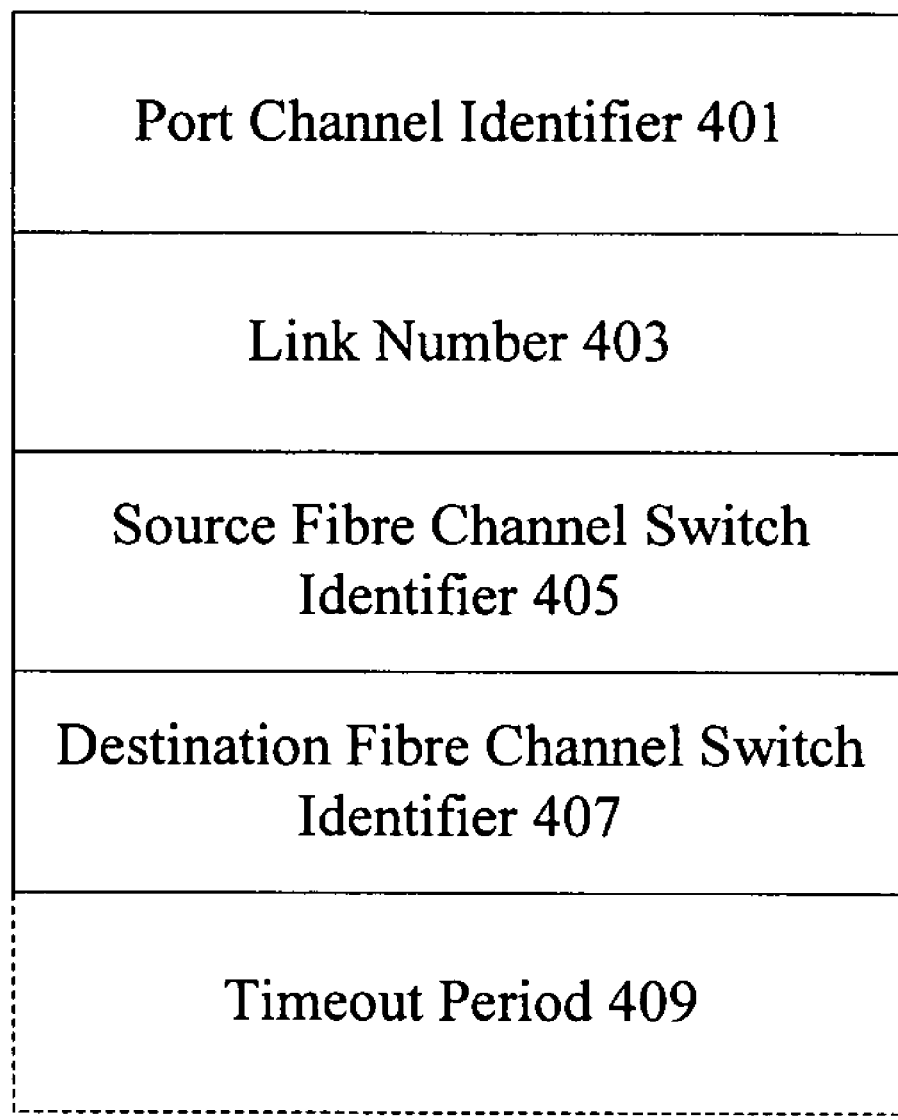
FIG. 4 is a diagrammatic representation showing a flush packet.

Instead of waiting for a worst case link drain period, the techniques of the present invention contemplate actively transmitting flush messages to minimize the link drain period. FIG. 4 is a diagrammatic representation showing one example of a flush message. The flush message includes a port channel identifier 401 and a link number 403. The flush message can also include source and destination identifiers 405 and 407 associated with the switches coupled by the port channel. An optional timeout period 409 is also included. The optional timeout period 409 may be used to indicate how long switches should wait for various messages.

Figure 5:
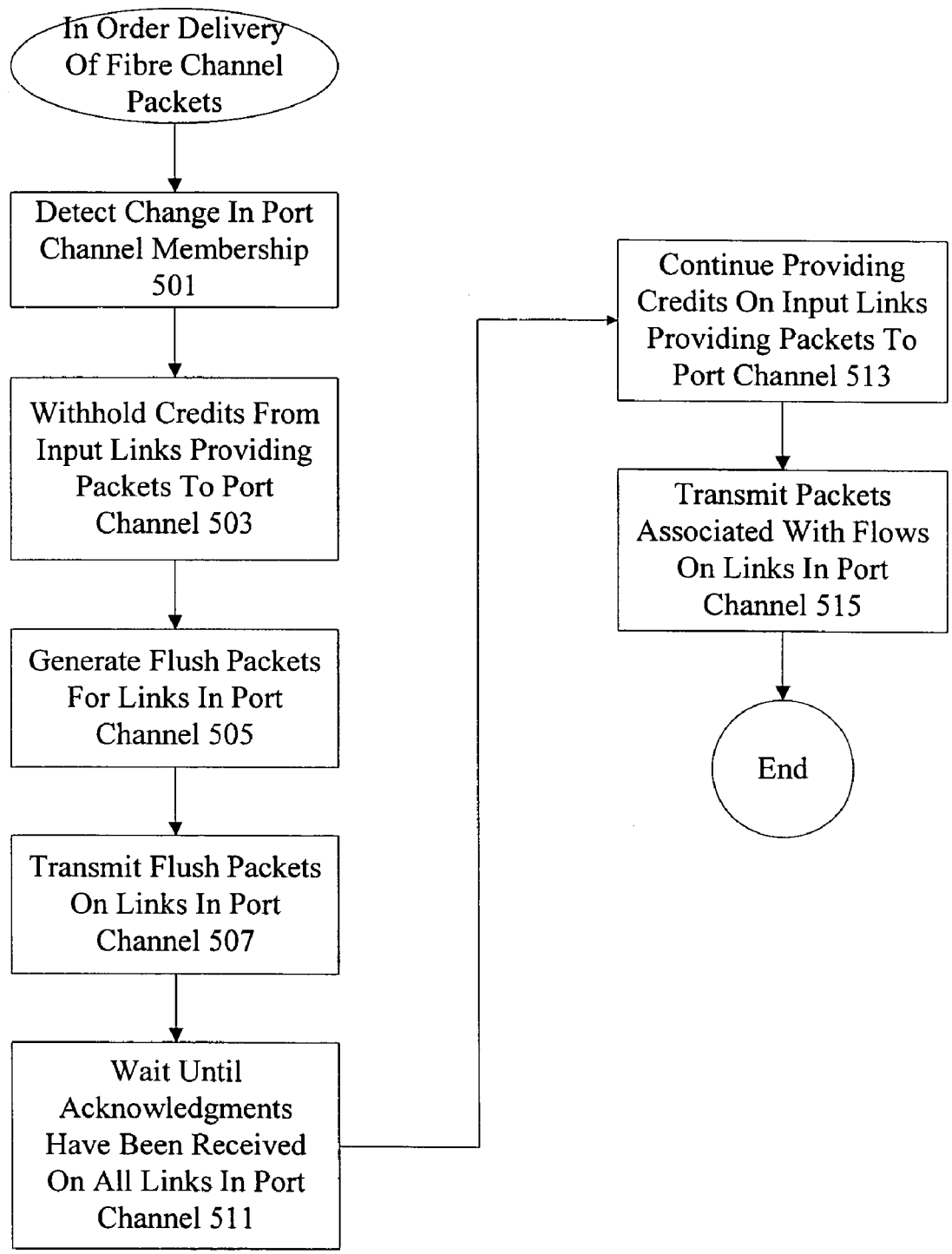
FIG. 5 is a flow process diagram showing one technique for forwarding packets in order.

FIG. 5 is a flow process diagram showing one technique for providing in order delivery of fibre channel messages. At 501, a change in port channel membership is detected at a fibre channel switch. Any change in a port channel that can lead to out of order delivery of fibre channel packets between two switches connected by the port channel is referred to herein as a port channel change. In some examples, a port channel change may include the addition or removal of a link. The port channel change can cause possible out of order delivery for affected flows being transmitted over the port channel. At 503, credits are withheld from links providing packets associated with the affected flows. In some examples, credits are withheld after buffers are full. Credits may be withheld on all links or only on certain links providing traffic associated with affected flows.

At 505, flush messages or flush packets are generated for links in the affected port channel. At 507, flush packets are transmitted on the affected port channel links. At 511, the fibre channel switch waits until acknowledgments have been received on all links in the affected port channel. The wait period is typically substantially shorter than a worst case link drain period. At 513, the fibre channel switch continues providing credits on input links providing packets to port channel 513. At 515, packets associated with flows on links in the affected port channel are transmitted.

Figure 6:
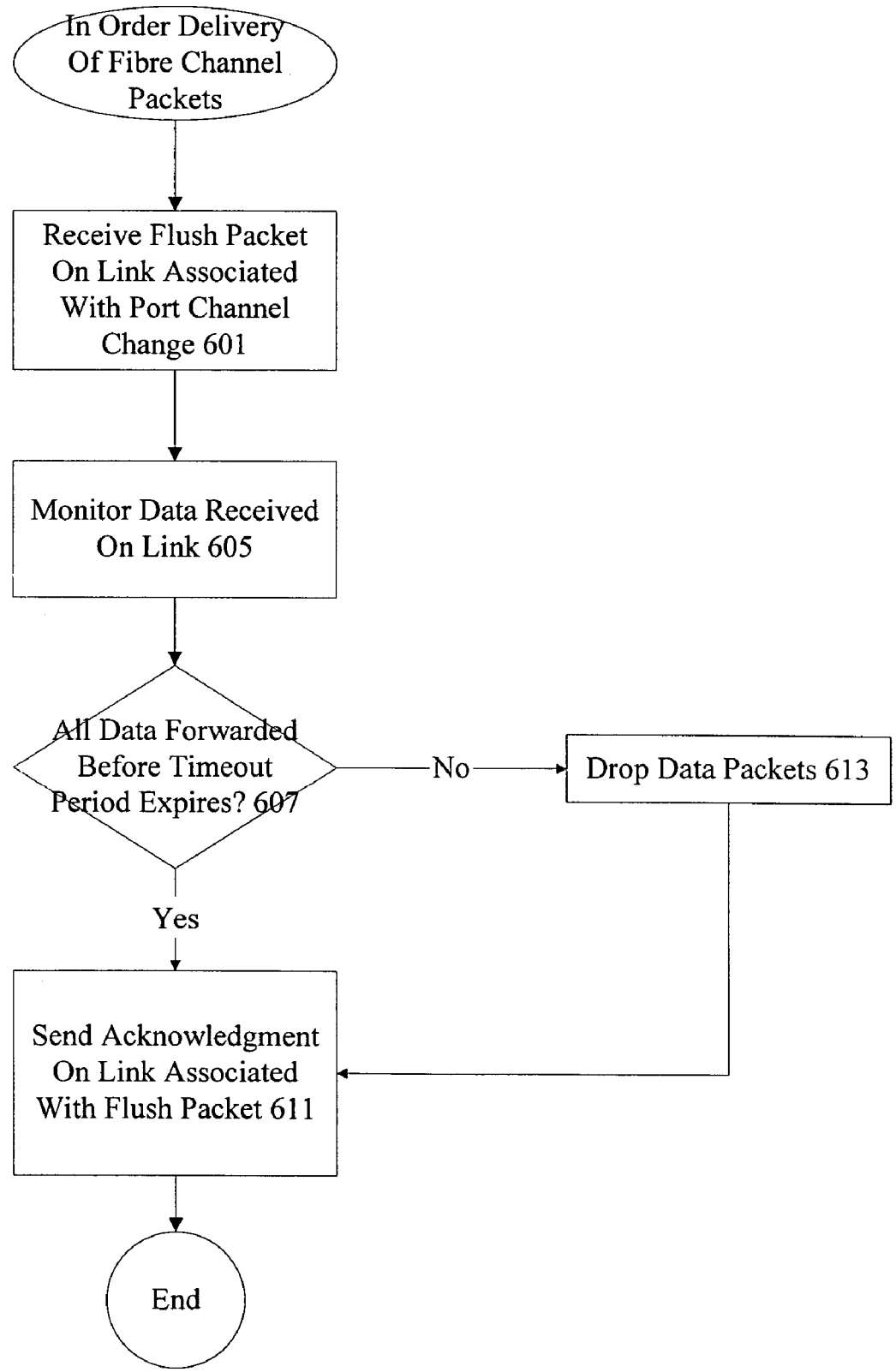
FIG. 6 is a flow process diagram showing one technique for handling flush packets.

FIG. 6 is a flow process diagram showing a technique for handling flush packets at a fibre channel switch receiving flush packets. At 601, a flush packet is received on a link associated with a port channel change. In some examples, a single flush packet is used to flush all of the links in a port channel. In this particular example, a flush packet is received for each link in a port channel. At 605, data received on the link but not yet forwarded is monitored. According to various embodiments, the switch monitors the data stored in line card buffers and queues to ensure that everything is forwarded before additional data associated with the flow is received.

At 607, it is determined if all data associated with the link has been forwarded before a timeout. In some instances, the timeout may be preconfigured or may be provided in the flush packet itself. If all data has been forwarded, an acknowledgment is sent on the link associated with the flush packet at 611. If not all data has been forwarded, data is dropped at 613 and an acknowledgment is sent at 611.

Figure 7:
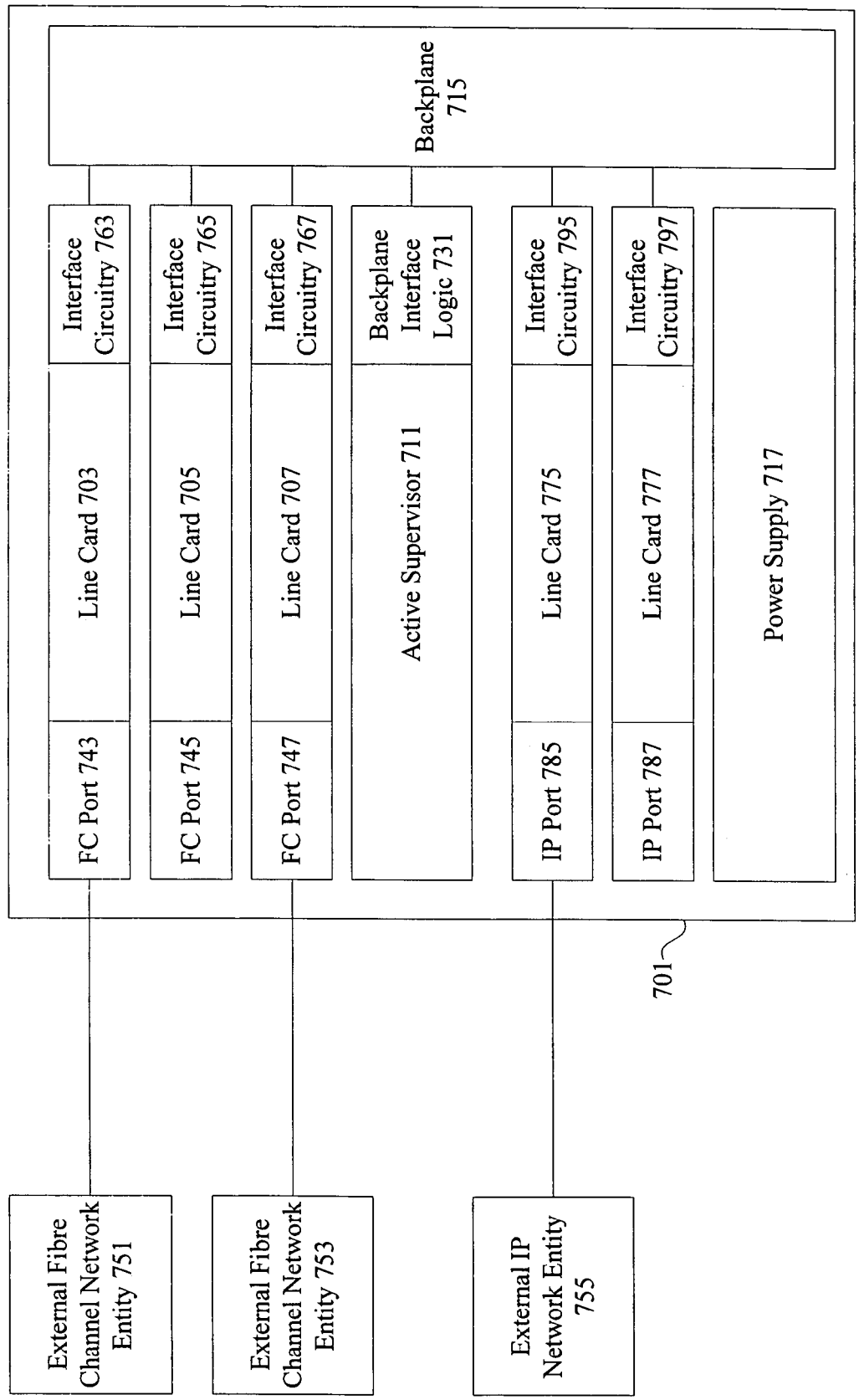
FIG. 7 is a diagrammatic representation showing one example of a fibre channel switch.

FIG. 7 is a diagrammatic representation of one example of a fibre channel switch that can be used to implement techniques of the present invention. Although one particular configuration will be described, it should be noted that a wide variety of switch and router configurations are available. The tunneling switch 701 may include one or more supervisors 711. According to various embodiments, the supervisor 711 has its own processor, memory, and storage resources.

Line cards 703, 705, and 707 can communicate with an active supervisor 711 through interface circuitry 783, 785, and 787 and the backplane 715. According to various embodiments, each line card includes a plurality of ports that can act as either input ports or output ports for communication with external fibre channel network entities 751 and 753. The backplane 715 can provide a communications channel for all traffic between line cards and supervisors. Individual line cards 703 and 707 can also be coupled to external fibre channel network entities 751 and 753 through fibre channel ports 743 and 747.

External fibre channel network entities 751 and 753 can be nodes such as other fibre channel switches, disks, RAIDS, tape libraries, or servers. The fibre channel switch can also include line cards 775 and 777 with IP ports 785 and 787. In one example, IP port 785 is coupled to an external IP network entity 755. The line cards 775 and 777 also have interfaces 795 and 797 to the backplane 715.

It should be noted that the switch can support any number of line cards and supervisors. In the embodiment shown, only a single supervisor is connected to the backplane 715 and the single supervisor communicates with many different line cards. The active supervisor 711 may be configured or designed to run a plurality of applications such as routing, domain manager, system manager, and utility applications.

According to one embodiment, the routing application is configured to provide credits to a sender upon recognizing that a packet has been forwarded to a next hop. A utility application can be configured to track the number of buffers and the number of credits used. A domain manager application can be used to assign domains in the fibre channel storage area network. Various supervisor applications may also be configured to provide functionality such as flow control, credit management, and quality of service (QoS) functionality for various fibre channel protocol layers.

In addition, although an exemplary switch is described, the above-described embodiments may be implemented in a variety of network devices (e.g., servers) as well as in a variety of mediums. For instance, instructions and data for implementing the above-described invention may be stored on a disk drive, a hard drive, a floppy disk, a server computer, or a remotely networked computer. Accordingly, the present embodiments are to be considered as illustrative and not restrictive, and the invention is not to be limited to the details given herein, but may be modified within the scope and equivalents of the appended claims.

While the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of network protocols and architectures. It is therefore intended that the invention be interpreted to include all variations and equivalents that fall within the true spirit and scope of the present invention.

What is claimed is:

1. A method comprising:
    detecting a membership change at a port channel;
    blocking fibre channel packets associated with the port channel at a first fibre channel switch upon detecting the membership change, the port channel including a plurality of links connecting the first fibre channel switch to a second fibre channel switch;
    transmitting a plurality of flush packets on the plurality of links;
    unblocking fibre channel packets associated with the port channel upon receiving acknowledgments for the plurality of flush packets from the second fibre channel switch.

2. The method of claim 1, wherein the membership change at the port channel comprises the addition or removal of a link.

3. The method of claim 1, wherein blocking fibre channel packets associated with the port channel comprises withholding credits from one or more input links providing the fibre channel packets.

4. The method of claim 3, wherein the packets are associated with a flow between a source and a destination.

5. The method of claim 4, wherein credits are withheld from links providing packets associated with the flow.

6. The method of claim 1, wherein the first switch includes a plurality of virtual output queues.

7. The method of claim 6, wherein virtual output queues associated with the port channel are blocked.

8. The method of claim 1, wherein unblocking fibre channel packets associated with the port channel comprises providing credits to one or more input links providing the fibre channel packets to the first fibre channel switch.

9. The method of claim 1, wherein the second switch flushes the packets associated with the plurality of links upon receiving the plurality of flush packets.

10. The method of claim 2, wherein flushing the packets comprises transmitting the packets at the second fibre channel switch.

11. A fibre channel switch comprising:
    a processor configured to detect a membership change at a port channel and block fibre channel packets associated with the port channel upon detecting the membership change, the port channel including a plurality of links connected to a neighboring fibre channel switch;

an output interface configured to transmit a plurality of flush packets on the plurality of links;

wherein the processor is further configured to unblock fibre channel packets associated with the port channel upon receiving acknowledgments for the plurality of flush packets from the neighboring fibre channel switch.

12. The fibre channel switch of claim 11, wherein the membership change at the port channel comprises the addition or removal of a link.

13. The fibre channel switch of claim 11, wherein blocking fibre channel packets associated with the port channel comprises withholding credits from one or more input links providing the fibre channel packets.

14. The fibre channel switch of claim 13, wherein the packets are associated with a flow between a source and a destination.

15. The fibre channel switch of claim 14, wherein credits are withheld from links providing packets associated with the flow.

16. The fibre channel switch of claim 11, wherein the fibre channel switch includes a plurality of virtual output queues.

17. The fibre channel switch of claim 16, wherein virtual output queues associated with the port channel are blocked.

18. The fibre channel switch of claim 11, wherein unblocking fibre channel packets associated with the port channel comprises providing credits to one or more input links providing the fibre channel packets to the fibre channel switch.

19. The fibre channel switch of claim 11, wherein the neighboring switch flushes the packets associated with the plurality of links upon receiving the plurality of flush packets.

20. The fibre channel switch of claim 12, wherein flushing the packets comprises transmitting the packets at the neighboring fibre channel switch.

21. A system comprising:

means for detecting a membership change at a port channel;

means for blocking fibre channel packets associated with the port channel at a first fibre channel switch upon detecting the membership change, the port channel including a plurality of links connecting the first fibre channel switch to a second fibre channel switch;

means for transmitting a plurality of flush packets on the plurality of links;

means for unblocking fibre channel packets associated with the port channel upon receiving acknowledgments for the plurality of flush packets from the second fibre channel switch.

22. The system of claim 21, wherein the membership change at the port channel comprises the addition or removal of a link.

23. The system of claim 21, wherein blocking fibre channel packets associated with the port channel comprises withholding credits from one or more input links providing the fibre channel packets.

24. The system of claim 23, wherein the packets are associated with a flow between a source and a destination.

25. The system of claim 24, wherein credits are withheld from links providing packets associated with the flow.

* * * * *

UNITED STATES PATENT AND TRADEMARK OFFICE
CERTIFICATE OF CORRECTION

PATENT NO. : 7,649,844 B2 Page 1 of 1
APPLICATION NO. : 11/027252
DATED : January 19, 2010
INVENTOR(S) : Bector et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1067 days.

Signed and Sealed this

Twenty-eighth Day of December, 2010

David J. Kappos
*Director of the United States Patent and Trademark Office*